3,332,973
SILPHENYLENE-SILOXANE FLUIDS AND METHOD OF PREPARATION

Robert L. Merker, Pittsburgh, Pa., assignor to Dow Corning Corporation, Midland, Mich., a corporation of Michigan
No Drawing. Filed Feb. 27, 1963, Ser. No. 261,514
6 Claims. (Cl. 260—448.2)

This invention relates to new fluid silphenylene-siloxane copolymers.

More particularly this invention relates to fluid silphenylene-siloxane copolymers having the average general formulae

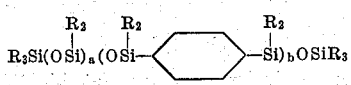

and

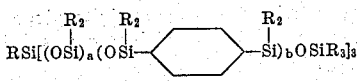

wherein each R is independently selected from the group consisting of methyl and 3,3,3-trifluoropropyl radicals, $a$ and $b$ are integers such that the ratio of $a$ to $b$ is in the range from 1:1 to 12.5:1, said copolymers having viscosities from 15 to 350,000 cs. at 25° C.

The fluid copolymers of this invention are useful, for example, as lubricants, dielectric coolants, damping and viscous drive fluids and as viscosity index improvers for silicate and other hydraulic fluids. The fluid copolymers of this invention are particularly useful at high temperatures because of their thermal stability and the fact that they combine thermal stability with a relatively small change in viscosity with changing temperature.

It should be understood that the various siloxane units can be arranged in any configuration within the limits set by the above average formulae. For example, within any particular molecule, the R$_2$SiO and the silphenylene units can be arranged in a regular or in a random manner and the R$_3$Si— and the RSi≡ groups can be attached to either the R$_2$SiO units or the silphenyl units or to both types of said units.

The compositions of this invention can be prepared in several ways. For example, one can equilibrate linear or cyclic R$_2$SiO polymers with linear or cyclic silphenylene polymers. During the equilibration R$_3$Si— and RSi≡ units can be introduced by any convenient procedure. If desired one can cocondense.

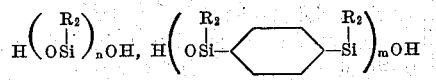

R$_3$SiX and RSiX$_3$ in which X is a hydroxyl reactive group such as acetoxy, alkoxy, etc. Fnally one can cohydrolyze the corresponding hydrolyzable silanes, i.e. R$_2$SiCl$_2$,

R$_3$SiCl and if desired RSiCl$_3$. All of these processes are well known in the organosilicon art. It will be clear to those skilled in the art that a combination of two or more of the above procedures can be used.

The best method known at this time for preparing the siphenylene-siloxane copolymer fluids consists of equilibrating the desired molar ratios of para-bis-(dimethylhydroxysilyl)benzene, dimethylsiloxane cyclics and a trimethylsilyl-endblocked polydimethylsiloxane fluid having a viscosity of from 0.65 to 300,000 cs. at 25° C. at a temperature of from 100 to 190° C. for 10 to 35 hours in the presence of an alkaline catalyst such as potassium hydroxide. It is preferred that a trimethylsilyl-endblock polydimethylsiloxane having a viscosity of 1 to 100 cs. at 25° C., a temperature of 140 to 170° C. and a time of 15 to 30 hours be employed.

Any suitable alkaline catalyst can also be used. For example, the catalyst can be potassium hydroxide, sodium hydroxide, ammonium hydroxide, potassium dimethylsilanolate, etc.

The following examples are for the purpose of illustration only and should not be construed as limiting to the invention.

Example 1

247 g. of para-bis(dimethylhydroxysilyl)benzene, 265.5 g. of polydimethylsiloxane cyclics, 17.8 g. of a trimethylsiloxy-endblocked dimethylsiloxane fluid having a viscosity of 1.5 cs. at 25° C., about 530 g. of dry toluene and one percent potassium hydroxide (catalyst) were added to a reaction vessel and refluxed for 16 hours at 110 to 120° C. The catalyst was then neutralized with trimethylchlorosilane. The toluene and other low molecular weight materials were stripped from the fluid to 255° C. at a pressure of 1 mm. of mercury. The 452 g. of product obtained was treated with 2.5 g. of Nuchar (an activated charcoal) for 2 hours at 75° C. and then filtered thru Super-Cel (a diatomaceous silica). The filtered product consisted of 397.3 g. of a fluid having a viscosity of 385.5 cs. at 25° C.

Example 2

219 g. of para-bis(dimethylhydroxysilyl)benzene, 437.5 g. of polydimethylsiloxane cyclics, 20.4 g. of a trimethylsiloxy-endblocked dimethylsiloxane fluid having a viscosity of 1.5 cs. at 25° C., about 677 g. of toluene and 1 percent of optasium hydroxide were added to a reaction vessel and refluxed for 16 hours at 114 to 115° C. The fluid was then neutralized with 7.0 g. of trimethylchlorosilane. The toluene and low molecular weight materials were stripped from the fluid to 269° C. at a pressure of 1 mm. of mercury. The 546 g. of product obtained was treated with 5 g. of Nuchar for 2 hours at 70 to 75° C. and then filtered thru Super-Cel. The filtered product consisted of 490 g. of a fluid having a viscosity of 209.5 cs. at 25° C.

Example 3

113 g. of para-bis(dimethylhydroxysilyl)benzene, 200 g. of polydimethylsiloxane cyclics, 124 g. of a trimethylsiloxy-endblocked dimethylsiloxane fluid having a viscosity of 1.5 cs. at 25° C., 426 g. dry toluene and 4.3 g. of potassium hydroxide pellets were added to a reaction vessel and equilibrated for 18 hours at 110 to 120° C. The fluid was then neutralized with 12 g. of trimethylchlorosilane. The toluene and low molecular weight materials were stripped from the fluid to 250° C. at a pressure of 0.275 mm. of mercury. Then the product was treated with Nuchar and filtered. The filtered product consisted of 191.7 g. of a clear liquid having a viscosity of 36.6 cs. at 25° C.

Example 4

226 g. of para-bis(dimethylhydroxysilyl)benzene, 163 g. of octamethylcyclotetrasiloxane, 124 g. of a trimethylsiloxy-endblocked dimethylsiloxane fluid having a viscosity of 1.5 cs. at 25° C. and 5.0 g. of potassium hydroxide pellets were placed in a reaction vessel and equilibrated for 24 hours at 140 to 160° C. The catalyst was then neutralized with 10 g. of trimethylchlorosilane. The fluid was stripped of low molecular weight materials to 275° C. at a pressure of 0.15 mm. of mercury. The product was treated with 3 g. of Nuchar and then filtered thru Super-Cel. The filtered product consisted of 207.7 g. of a clear liquid having a viscosity of 59.5 cs. at 25° C.

Example 5

452 g. of para-bis(dimethylhydroxysilyl) benzene, 326 g. of octamethylcyclotetrasiloxane, 248 g. of a trimethylsiloxy-endblocked dimethylsiloxane fluid having a viscosity of 1.5 cs. at 25° C. and 10 g. of potassium hydroxide were added to a reaction vessel and equilibrated for 24 hours at 150 to 160° C. The fluid was then neutralized with 120 g. of trimethylchlorosilane. The low molecular weight materials were stripped from the fluid to 335° C. at a pressure of 0.7 to 0.8 mm. of mercury. Nuchar was added to the fluid and it was filtered hot. 755 g. of a slightly hazy fluid was obtained. The fluid was then chilled with Dry Ice and filtered thru Super-Cel. The product had a viscosity of 142.6 cs. at 25° C.

Example 6

338 g. of para-bis(dimethylhydroxysilyl)benzene, 771 g. of polydimethylsiloxane cyclics, 7.5 g. of a trimethylsiloxy-endblocked dimethylsiloxane fluid having a viscosity of 5 cs. at 25° C. and 10 g. of the potassium salt of polydimethylsilanolate were added to a reaction vessel and heated for about 24 hours at 150 to 160° C. The fluid was then diluted with toluene, neutralized with Dry Ice and filtered. The toluene and other volatiles were stripped from the fluid in two stages, the first stage being to 170° C. at a pressure of 28 mm. of mercury and the second stage being to 300° C. at a pressure of 1 mm. of mercury. The 964 g. of product obtained was a fluid having a viscosity of about 5000 (i.e. 4959) cs. at 25° C.

Example 7

559 g. of para-bis(dimethylhydroxysilyl)benzene 1287 g. of polydimethylsiloxane cyclics, 27 g. of a trimethylsiloxy-endblocked dimethylsiloxane fluid having a viscosity of 5 cs. at 25° C. and 18 g. of the potassium salt of polydimethylsilanolate were added to a reaction vessel and heated for about 20 hours at 150° C. The fluid then was cooled, diluted with toluene, neutralized with Dry Ice and filtered. The toluene and other volatiles were stripped from the fluid in two stages, the first stage being to 175° C. at a pressure of 25 mm. of mercury and the second stage being to 304° C. at a pressure of 0.1 mm. of mercury. The 1230 g. of product obtained was a fluid having a viscosity of 15,300 cs. at 25° C.

Example 8

This example illustrates the fact that the fluid silphenylene-siloxane copolymers of this invention have better thermal stability at high temperatures than similar fluids containing only methyl groups.

The thermal stability test consisted of heating the fluids, under nitrogen, in an oven at 250° C. for 24 hours. The viscosities of the fluids were measured at 25° C. both before and after they were heated in the oven. The fluid samples were prepared for the oven by placing them in a tube, evacuating the air from the tube, purging with nitrogen and then sealing the tube. The silphenylene-siloxane fluid used in the test was that of Example 6. The test results are set forth below and show that the percent change in the viscosity of the polydimethylsiloxane fluid was more than twice as great as the change in the viscosity of the silphenylene-siloxane fluid of this invention.

| Fluid | Viscosity at 25° C. (cs.) | | Percent Change |
|---|---|---|---|
| | Before heating | After heating | |
| phenylene-siloxane | 4,959 | 3,595 | 27.5 |
| polydimethylsiloxane | 5,070 | 1,858 | 63.3 |

Example 9

62.5 g. of a hydroxylated polydimethylsiloxane fluid having a degree of polymerization of about 18. 62.5 g. of para-bis(dimethylhydroxysilyl)benzene and 31 cc. tetrahydrofuran were refluxed until the monomers had dissolved. Then 22.4 g. of trimethylacetoxysilane was added and the mixture refluxed 2½ hours. Then, after the addition of 0.6 g. of tetramethylguanidine-di-2-ethylhexoate, the mixture was refluxed for one more hour. The mixture was then diluted with benzene and the acetic acid washed out with water. The benzene was then distilled off, and 0.10 percent by weight KOH, based on the monomers, was added. After removal of the water azeotrope, the mixture was refluxed for 2½ hours. The reaction products were washed with water, dried over Na₂SO₄ and then filtered. The product was clear and colorless and had a viscosity of 91 cs. at 25° C. The product was tested for thermal stability as above except that it was heated for 8 hours at 800° F. Before heating the fluid had a viscosity of 19.2 cs. at 210° F. After heating it was found to have a viscosity of 18.6 cs. at 210° F. This is a change in viscosity of only 3.1 percent.

Example 10

When an equivalent amount of bis(3,3,3-trifluoropropyl)siloxane cyclics are substituted for the dimethylsiloxane cyclics of Example 1, a silphenylene-siloxane copolymer fluid is obtained which contains 3,3,3-trifluoropropyl groups.

Example 11

When a mixture of dimethylsiloxane and bis(3,3,3-trifluoropropyl)siloxane cyclics are substituted for the polydimethylsiloxane cyclics of Example 3, a silphenylene-siloxane copolymer fluid is obtained which contains both methyl and 3,3,3-trifluoropropyl groups.

Example 12

When an equivalent amount of (methyl)3,3,3-trifluoropropylsiloxane cyclics are substituted for the dimethylsiloxane cyclics of Example 2, another silphenylene-siloxane copolymer fluid is obtained which contains both methyl and 3,3,3-trifluoropropyl radicals.

Example 13

When the desired ratios of $CH_3Si[OSi(CH_3)_3]_3$, $[(CH_3)_2SiO]_4$ and

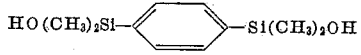

are equilibrated in the presence of an alkaline catalyst a silphenylene-siloxane copolymer fluid having the average general formula

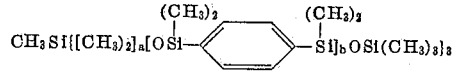

is obtained.

That which is claimed is:

1. Silphenylene-siloxane copolymers having the average general formula

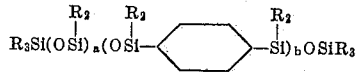

and wherein each R is independently selected from the group consisting of methyl and 3,3,3-trifluoropropyl radicals, $a$ and $b$ are integers such that the ratio of $a$ to $b$ is in the range from 1:1 to 12.5:1, said copolymers having viscosities in the range from 15 to 350,000 cs. at 25° C.

2. The silphenylene-siloxane copolymers of claim 1 having the average general formula

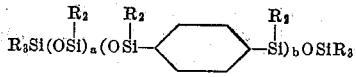

3. The silphenylene-siloxane copolymers of claim 2 wherein the ratio of $a$ to $b$ is in the range from 3:1 to 7:1.

4. The silphenylene-siloxane copolymers of claim 2 wherein all of the R groups are methyl radicals.

5. The silphenylene-siloxane copolymers of claim 2 wherein the R groups are a mixture of methyl and 3,3,3-trifluoropropyl radicals.

6. The method for preparing silphenylene-siloxane copolymers having the average general formula

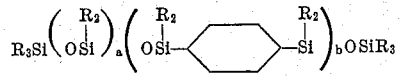

wherein each R is independently selected from the group consisting of methyl and 3,3,3-trifluoropropyl radicals, $a$ and $b$ are integers such that the ratio of $a$ to $b$ is in the range from 1:1 to 12.5:1, said method comprising equilibrating a mixture consisting of para-bis(dimethylhydroxysilyl)benzene, at least one cyclic selected from the group consisting of dimethylsiloxane cyclics, bis-(3,3,3-trifluoropropyl)-siloxane cyclics and (methyl) 3,3,3-trifluoropropylsiloxane cyclics and a trimethylsilylendblocked dimethylsiloxane fluid having a viscosity of from 0.65 to 300,000 cs. at 25° C. at a temperature of from 100 to 190° C. for 10 to 35 hours in the presence of an alkaline catalyst, whereby a fluid having a viscosity in the range from 15 to 350,000 cs. at 25° C. is obtained

References Cited

UNITED STATES PATENTS

| | | | |
|---|---|---|---|
| 2,410,714 | 11/1946 | Clark | 252—63.7 |
| 2,445,563 | 7/1948 | Clark | 252—63.7 |
| 3,019,191 | 1/1962 | Furby et al. | 252—78 |
| 3,048,545 | 8/1962 | Critchley et al. | 252—78 |
| 3,117,149 | 1/1964 | Holdstock | 260—448.2 |
| 3,135,777 | 6/1964 | Nielsen | 260—448.2 |

TOBIAS E. LEVOW, *Primary Examiner.*

SAMUEL H. BLECH, HELEN M. McCARTHY, P. F. SHAVER, *Assistant Examiners.*